United States Patent
Chien (10) Patent No.: US 8,050,636 B2
(45) Date of Patent: Nov. 1, 2011

(54) APPARATUS AND METHOD FOR GENERATING RF WITHOUT HARMONIC INTERFERENCE

(75) Inventor: Hung-Ming Chien, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 578 days.

(21) Appl. No.: 11/320,463

(22) Filed: Dec. 29, 2005

(65) Prior Publication Data

US 2007/0123183 A1     May 31, 2007

Related U.S. Application Data

(60) Provisional application No. 60/740,648, filed on Nov. 30, 2005.

(51) Int. Cl.
H04B 1/04           (2006.01)
(52) U.S. Cl. ............... 455/114.2; 455/41.2; 455/315
(58) Field of Classification Search ............ 455/114.2, 455/41.2, 315–319, 41.1–41.3, 260, 76
See application file for complete search history.

(56) References Cited

U.S. PATENT DOCUMENTS

| | | | |
|---|---|---|---|
| 6,317,608 B1 * | 11/2001 | Glocker | 455/553.1 |
| 6,345,172 B1 * | 2/2002 | Hirai et al. | 455/76 |
| 6,960,962 B2 * | 11/2005 | Peterzell et al. | 331/40 |
| 6,985,701 B2 * | 1/2006 | Yoshida et al. | 455/76 |
| 7,020,451 B2 * | 3/2006 | Sugar et al. | 455/114.2 |
| 7,053,798 B2 * | 5/2006 | Popineau | 341/20 |
| 7,181,181 B2 * | 2/2007 | Lee et al. | 455/260 |
| 7,266,352 B2 * | 9/2007 | Soe et al. | 455/318 |
| 7,373,132 B2 * | 5/2008 | Shimanuki | 455/324 |
| 7,376,583 B1 * | 5/2008 | Rolf | 705/17 |
| 2004/0162023 A1 * | 8/2004 | Cho | 455/41.1 |
| 2004/0209611 A1 * | 10/2004 | Van Erven | 455/422.1 |
| 2007/0047625 A1 * | 3/2007 | Klomsdorf et al. | 455/41.2 |
| 2007/0110171 A1 * | 5/2007 | Iida | 375/260 |

* cited by examiner

Primary Examiner — Lana N Le
(74) Attorney, Agent, or Firm — Sterne, Kessler, Goldstein & Fox P.L.L.C.

(57) ABSTRACT

A transmitter capable of operating according to a first standard that does not interfere with a nearby frequency generator operating according to a second standard. The transmitter comprises an oscillator, a frequency divider, a mixer, and a filter. The oscillator is configured to output a first frequency that is outside of a frequency harmonic of the frequency generator. The frequency divider is coupled to the oscillator and divides the first frequency by a selective divide ratio to produce a second frequency. The mixer is configured to receive the first and second frequencies, which combines them to produce a mixed frequency. The filter is then used to filters the mixed frequency to obtain the higher portion of the mixed frequency. The divide ratio of the frequency divider is selected base on the desired output frequency of the transmitter such that a 2.4 GHz or 5 GHz ISM band frequency is achieved.

39 Claims, 8 Drawing Sheets

APPARATUS AND METHOD FOR GENERATING RF WITHOUT HARMONIC INTERFERENCE

CROSS-REFERENCE TO RELATED APPLICATIONS

This application claims priority to U.S. Provisional Application No. 60/740,648, filed Nov. 30, 2005, entitled "Apparatus And Method For Generating RF Without Harmonic Interference," incorporated herein by reference in its entirety.

BACKGROUND OF THE INVENTION

Wireless local area network (WLAN) has become one of the fastest growing and hottest technologies in the area of wireless communication. Today, there are several competing WLAN standards such as 802.11, Bluetooth, and HomeRF. Each of the standards is distinctively unique from one another and is appropriate for certain application and environment. Among these wireless standards, 802.11 is the most widely used.

802.11 actually comprises a set of different standards. An incomplete listing includes 802.11a, 802.11b, and 802.11g. When 802.11 is generally referred to without the trailing letter, the author most likely meant it to be 802.11b, which is commonly known as wireless fidelity or Wi-Fi. For this writing, 802.11 refers generally to the 802.11 family of standards as a whole. In recent years, the use of 802.11 has dramatically increased. 802.11 connectivity is now commonly used in corporate environment, home, shops, and even in a neighborhood community.

Devices that commonly use 802.11 to connect to the Internet include desktops and laptops. However, wireless technology is not limited to internet connectivity. WLAN standards such as Bluetooth, HomeRF, and even 802.11 can be used for secured device-to-device communication. The demand for increased mobility, security, and connectivity have now expanded beyond desktop and laptop to smaller devices such as personal digital assistant (PDA), mobile phones, and wireless headsets.

TABLE 1

| Standard | Carrier Frequency | Data | Range | Device Size |
|---|---|---|---|---|
| Bluetooth | 2.4 GHz | 1 Mbps | ~30 ft | Small Compared to 802.11 |
| 802.11a/j | 5 GHz | 54 Mbps | ~300 ft. indoor ~1000 ft. outdoor | Large Compared Bluetooth |
| 802.11b | 2.4 GHz | 11 Mbps | ~300 ft. indoor ~1000 ft. outdoor | Large Compared Bluetooth |
| 802.11g | 2.4 GHz | 36 or 54 Mbps | ~300 ft. indoor ~1000 ft. outdoor | Large Compared Bluetooth |

For smaller devices, Bluetooth is more suitable than 802.11 because of the battery and the physical size constraints. Bluetooth generally uses less power than 802.11, and the physical size of a Bluetooth chipset is also smaller than the 802.11 counterpart, see Table 1. Although Bluetooth does not transmit large amount of data as compared to 802.11, Bluetooth's maximum data transfer rate of 1 Mbps is sufficient to meet the data transfer demands of small devices. Today, Bluetooth is widely used in mobile phone, PDA, and headset. High-end automobiles are also now Bluetooth equipped to accommodate mobile phones with Bluetooth capability.

At the present rate of growth in 802.11 and Bluetooth enabled devices, more and more of these devices containing these two WLAN standards will operate in the same environment. This will lead to signal interferences as both standards typically operate on the same non-licensed ISM (industrial, scientific, and medical) band. In addition to signal interferences caused by devices operating at near frequencies, harmonic frequency interferences can also occur at the frequency generating sources of the two 802.11 and Bluetooth devices.

Harmonic interferences are especially prevalent where both standards are operating in the same small environment such as being in the same room, on the same computer, in the same package, or on the same semiconductor die. An example is a single access portal with the capability to transmit both 802.11 and Bluetooth compliance signals. Another example is a laptop with 802.11 capability for wirelessly connecting to the Internet and Bluetooth capability for communicating with a PDA. In yet still another example, a Bluetooth enabled mobile phone being next to a 802.11 enabled laptop, with both of the devices using their respective Bluetooth and 802.11 connectivity. In such environments, harmonic frequency interferences will likely exist because the frequency oscillators of those devices will likely interfere with each other. Unfortunately, this type of interference cannot be easily resolved.

Accordingly, there is a need in the art for an 802.11 transmitter to operate such that it does not interfere with another Bluetooth transmitter that is operating in close proximity.

BRIEF DESCRIPTION OF THE DRAWINGS/FIGURES

The present invention is described with reference to the accompanying drawings.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described. An embodiment of the present invention is now described. While specific methods and configurations are discussed, it should be understood that this is done for illustration purposes only. A person skilled in the art will recognize that other configurations and procedures may be used without departing from the spirit and scope of the invention.

Figure 1:
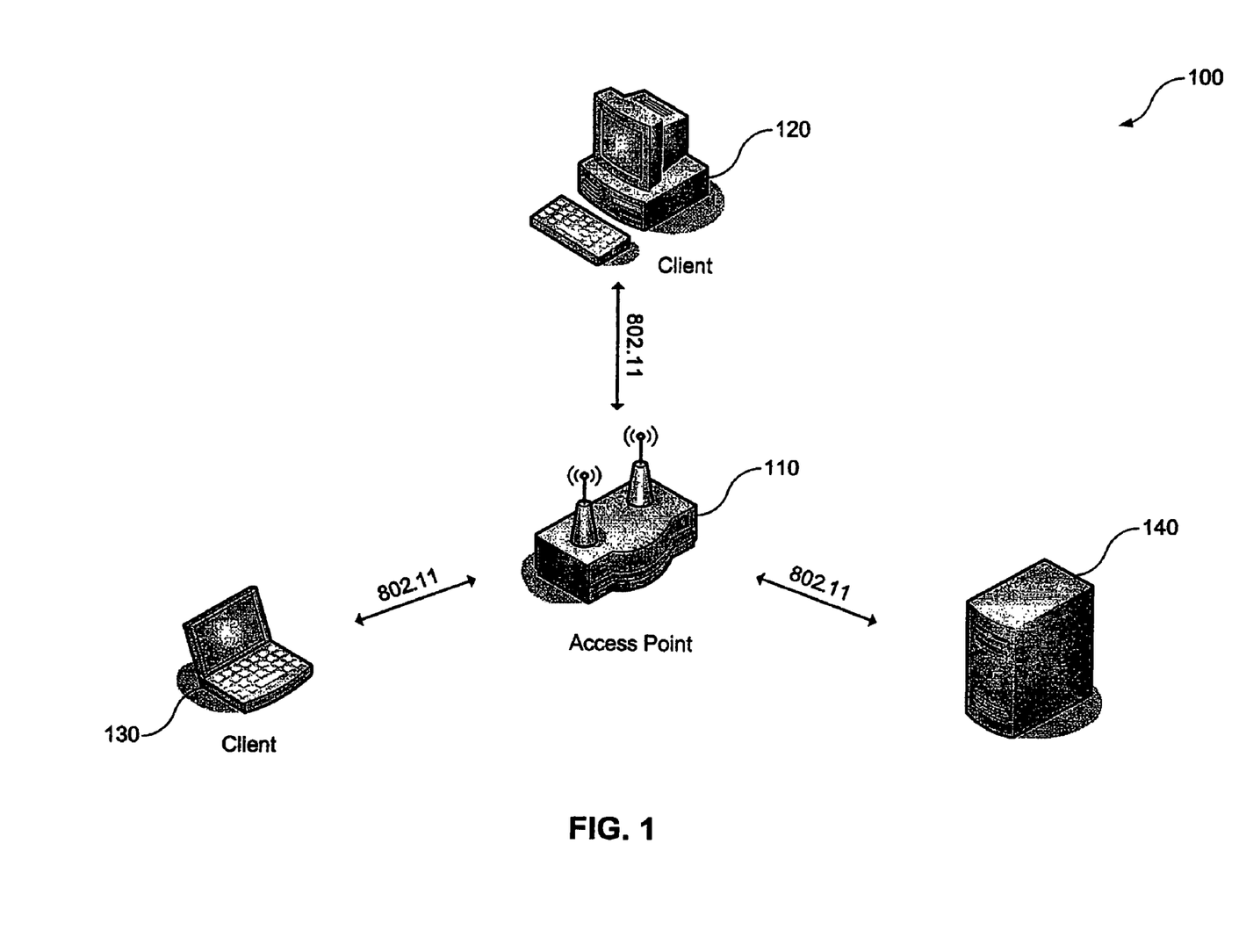
FIG. 1 illustrates an exemplary 802.11 network environment.

FIG. 1 illustrates a WLAN environment 100 that is operating in accordance to an 802.11 standard. The 802.11 WLAN environment 100 includes an access point 110, a desktop client 120, a laptop client 130, and a server client 140. Each of the clients 120, 130, and 140 is equipped with a 802.11 wireless network card that allows the client to connect with access point 110. Further, each of the clients in the environment 100 can also be configured to communicate with each other using the 802.11 WLAN standard.

As previously discussed, the 802.11 standard is a family of standards that includes 802.11a, 802.11b, and 802.11g. Among them, 802.11b is the most widely use. 802.11b has a maximum data transfer rate of 11 Mbps and a range of approximately 300 feet indoor or up to 1000 feet outdoor, see Table 1. 802.11b operates on a 2.4 GHz Industrial, Scientific, Medical (ISM) frequency band. Another widely used ISM frequency band is 5 GHz, which is the frequency band used by 802.11a and 802.11j. Both of the 2.4 GHZ and 5 GHz ISM bands are non-licensed. The 2.4 GHz band has been popular in applications such as cordless phones, wireless networks, and personal connectivity such as Bluetooth.

Figure 2:
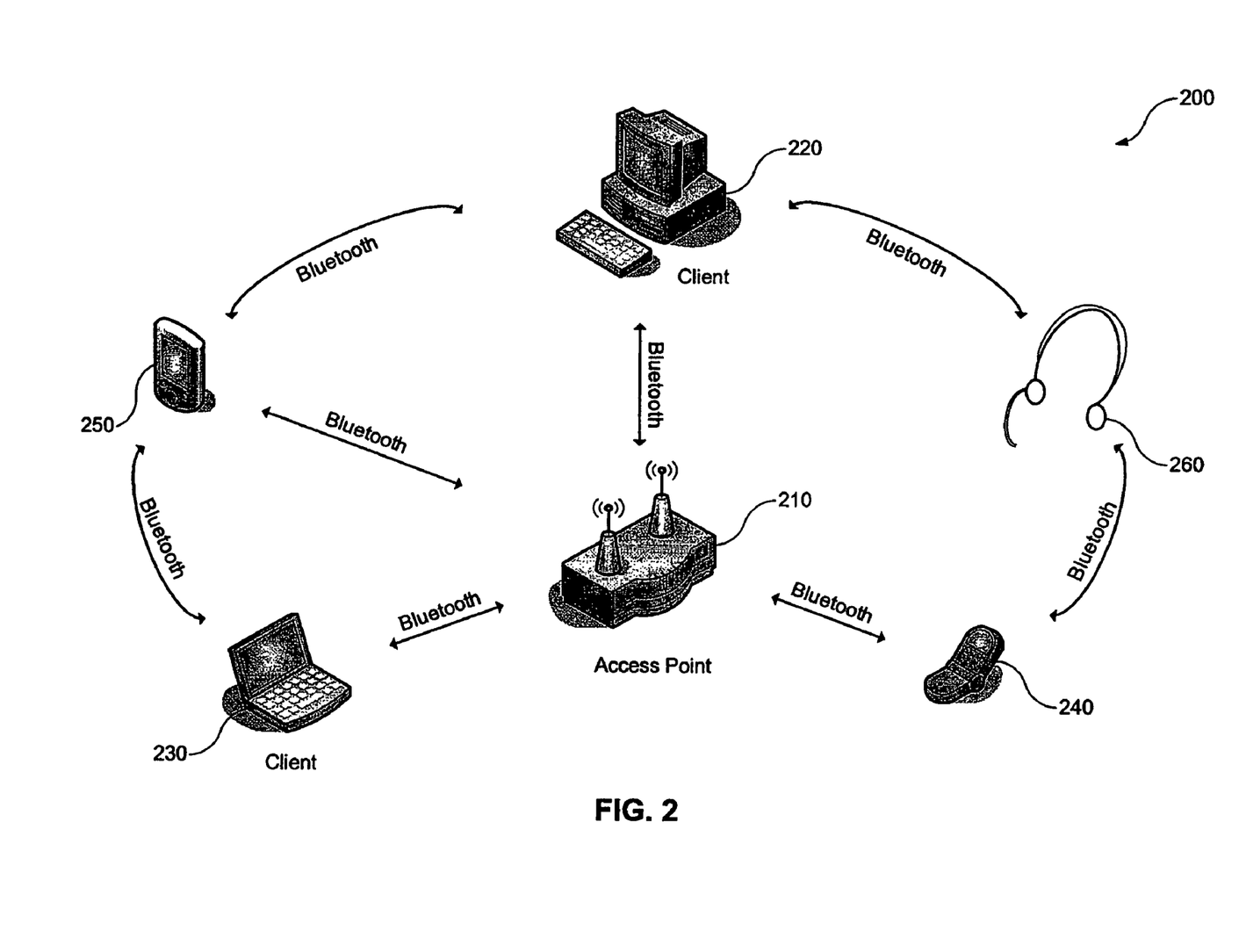
FIG. 2 illustrates an exemplary Bluetooth network environment.

FIG. 2 illustrates an exemplary Bluetooth WLAN environment 200. The Bluetooth environment 200 includes an access point 210, a desktop 220, a laptop 230, a wireless phone 240, a PDA 250, and a wireless headset 260. In the Bluetooth environment 200, each of the clients is connected to the access point 210 and to each other using the Bluetooth standard. Bluetooth is a radio frequency (RF) based connectivity standard that operates on the 2.4 GHz unlicensed ISM band. Bluetooth offers several benefits over 802.11 for use in small devices such as mobile phones and PDAs. Those benefits include low-cost and low-power characteristics. However, Bluetooth only has a maximum data transfer rate of 1 Mbps as compared to 54 Mbps with 802.11a. Because of its lower data transfer rate, it is not desirable to have Bluetooth connectivity between the desktop 220 or the laptop 230 and the access point 210, where activity such as net surfing or multi-player network gaming typically demands very large data transfer rate. As such, a 802.11 connection may be more desirable between the desktop 220 and the access point 210.

Figure 3:
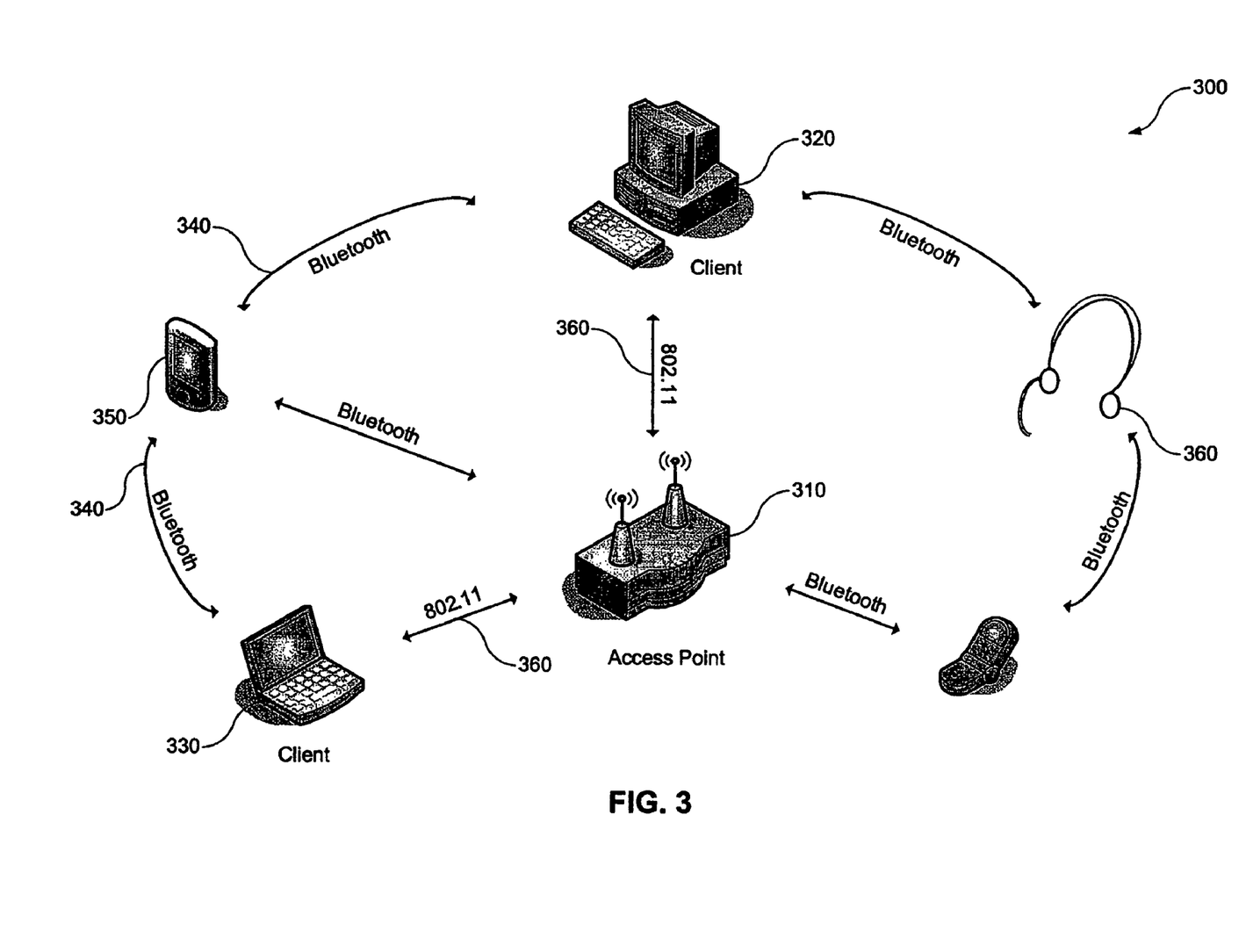
FIG. 3 illustrates an exemplary 802.11 and Bluetooth network environment according to an embodiment of the present invention.

FIG. 3 illustrates a multiple wireless standard environment 300 according to an embodiment of the present invention. The WLAN environment 300 operates with both 802.11 and Bluetooth standards. For example, desktop 320 is configured to communicate with PDA 350 using a Bluetooth connection 340. At the same time, desktop 320 can also be configured to communicate with access point 310 using a higher speed 802.11 connection 360. Similarly, laptop 330 can be configured to be compatible with both Bluetooth and 802.11.

In a confined wireless network environment such as the environment 300, there is a high probability for harmonic interferences at the Bluetooth and 802.11 transmitters. In order to generate the 2.4 GHz base band communication frequencies for a Bluetooth application, a VCO needs to operate at a frequency range of 1601.3 MHz to 1656 MHz. The output frequency of the VCO is then divided and combined with itself to generate a desired channel frequency. For example, to generate a Bluetooth frequency channel of 2402 MHz, the VCO needs to output at 1601.3 MHz. This frequency is then divided by half using a frequency divider and combined with itself (1601.3±800.65) using a mixer. Finally, to arrive at the desired channel frequency, the output of the mixer is pass through a high band pass filter, thus yielding 2402 MHz. It should be understood by one skilled in the art that other devices could be used in place of the VCO, frequency divider, mixer, and the band pass filter to perform the same functions.

The same concept applies for 802.11b and 802.11g when generating 2.4 GHz base band communication frequencies. In an 802.11b transmitter, a VCO is set to operate at a frequency range of 3216 MHz to 3312 MHz as compared to the operating frequency range of 1601.3-1656 MHz in a Bluetooth transmitter. To arrive at a desired 802.11b/g channel frequency, the same process for the Bluetooth frequency generation is repeated plus another frequency division step. For example, to generate a 802.11b/g channel frequency of 2460 MHz, the VCO is set to output at 3280 MHz. This VCO frequency is then divided by 2 and added with itself (1640±3280) using a frequency divider and a mixer. The mixer will then generate a high and a low frequency signal of 4920 MHz and 1640 MHz, respectively. The 1640 MHz signal is filtered out using a high band pass filter. Finally, to arrive at the desired channel frequency of 2460 MHz, the filtered frequency output of 4920 MHz is divided by 2 using another frequency divider, thus yielding 2460 MHz.

In an 802.11a or 802.11j transmitter, a VCO is set to operate at a frequency range of 3280-3933.3 MHz. To arrive at a desired channel frequency, the same process as described above for 802.11b/g is used. However, the last frequency division step is omitted. For example, to generate a 802.11a/j channel frequency of 4920 MHz, the VCO is set to output at 3280 MHz. This VCO frequency is then divided by 2 and added with itself (1640±3280) using a frequency divider and a mixer, thus yielding a channel frequency of 4920 MHz after passing the mixer output to a high band pass filter. It should be understood by one skilled in the art that other devices could be used in place of the VCO, frequency divider, mixer, and the band pass filter to perform the same functions.

As discussed, the concern is harmonic interference between the Bluetooth and the 802.11 transmitters. The interference is caused at the VCOs of the transmitters. A Bluetooth transmitter's VCO operates at a frequency range of 1601.3 MHz to 1656 MHz. Its second harmonic frequency range is from 3202.6 MHz to 3312 MHz. This harmonic frequency range overlaps the frequency ranges of the 802.11a and 802.11g VCOs that operate at 3280-3933.3 MHz and 3216-3312 MHz, respectively. In close proximity, the conventional 802.11a and 802.11g transmitters will "pull" or interfere with Bluetooth transmitter, and vice versa.

The overlap causes harmonic interference when the Bluetooth and 802.11 transmitters are placed near each other. In an wireless network environment such as the WLAN environment 300, harmonic interference will most likely occur because of the close proximity between the Bluetooth and 802.11 transmitters. To ensure a harmonic interference free environment, conventional transmitters should be placed far apart. Preferably, the 802.11 transmitter should be placed just outside of the operable transmitting range of the Bluetooth transmitter. This operable transmitting range is approximately 30 feet for Bluetooth. Such a requirement prevents a device from being compatible with both of the 802.11 and Bluetooth standards.

Figure 4:
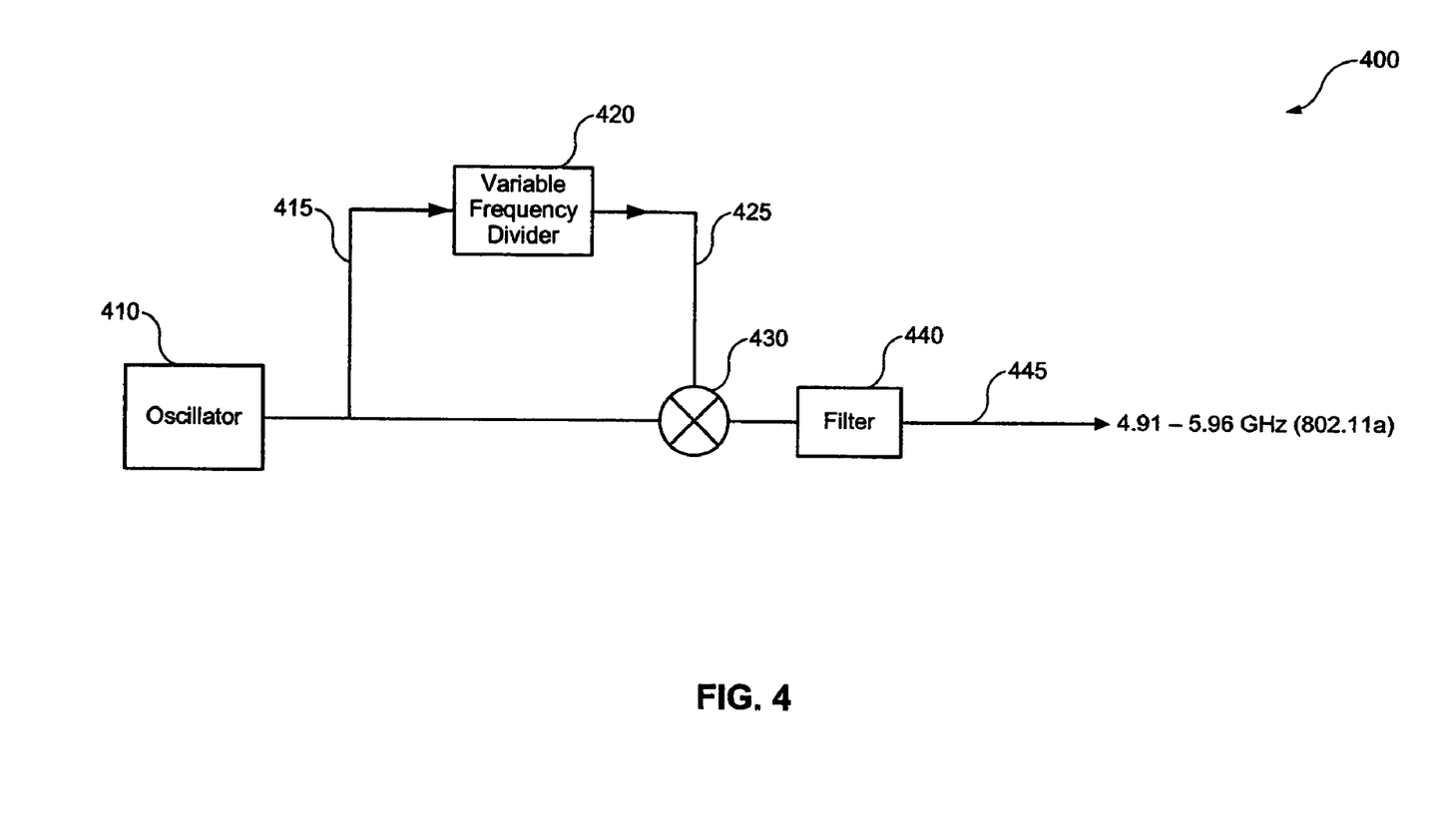
FIGS. 4-5 illustrate transmitter circuit diagrams according to embodiments of the present invention.

FIG. 4 illustrates a 802.11 frequency generation circuit 400 according to an embodiment of the present invention. Circuit 400 includes an oscillator 410, a variable frequency divider 420, a mixer 430, and a filter 440. Oscillator 410 is configured to generate frequency signals 415 that range from 3346.7 MHz to 4000 MHz. Frequency divider 420 is configured to receive frequency signals 415. Depending upon the desired 802.11 channel frequency output 445, frequency divider 420 selectively divides frequency signals 415 by a divide ratio of 2 or 4 to produce signals 425. Mixer 430 is configured to receive both frequency signals 415 and 425. Mixer 430 combines these two signals to produce a high and a low frequency, which is then delivered to filter 440. Filter 440 is a high band pass filter which filters out the low frequency signals and outputs high frequency signals 445 having the desired 802.11a channel frequency. Table 2 illustrates how the frequency

TABLE 2

| 802.11g Channel Freq. | Divide Ratio | VCO Freq. | 802.11a Channel Freq. | Divide Ratio | VCO Freq. |
|---|---|---|---|---|---|
| 2412 | 4 | 3859.20 | 4920 | 4 | 3936.00 |
| 2417 | 4 | 3867.20 | 4940 | 4 | 3952.00 |
| 2422 | 4 | 3875.20 | 4960 | 4 | 3968.00 |
| 2427 | 4 | 3883.20 | 4980 | 4 | 3984.00 |
| 2432 | 4 | 3891.20 | 5000 | 4 | 4000.00 |
| 2437 | 4 | 3899.20 | 5020 | 2 | 3346.67 |
| 2442 | 4 | 3907.20 | 5040 | 2 | 3360.00 |
| 2447 | 4 | 3915.20 | 5060 | 2 | 3373.33 |
| 2452 | 4 | 3923.20 | . | | |
| 2457 | 4 | 3931.20 | 5200 | 2 | 3466.67 |
| 2462 | 4 | 3939.20 | 5300 | 2 | 3533.33 |
| 2467 | 4 | 3947.20 | 5400 | 2 | 3600.00 |
| 2472 | 4 | 3955.20 | 5500 | 2 | 3666.67 |
| 2477 | 4 | 3963.20 | 5600 | 2 | 3733.33 |
| 2484 | 4 | 3974.40 | 5700 | 2 | 3800.00 |
| | | | 5900 | 2 | 3933.33 | generation circuit 400 generates 802.11a or 802.11g compliance channel frequencies according to an embodiment of the present invention.

Referring to Table 2, Column "802.11a Channel Freq.", for 802.11a frequency channel of 4920 MHz to 5000 MHz, the frequency divider 420 divides frequency signals 415 by a divide ratio of 4. For the same frequency range, the VCO's output frequency signals 415 vary from 3936 MHz to 4000 MHz. For the remaining 802.11a frequency channels, frequency divider 420 divides the VCO's output frequency signals 415 by a divide ratio of 2. In 802.11b and 802.11g applications, the frequency divider always divides the VCO's output frequency signals 415 by a divide ratio of 4.

Figure 5:
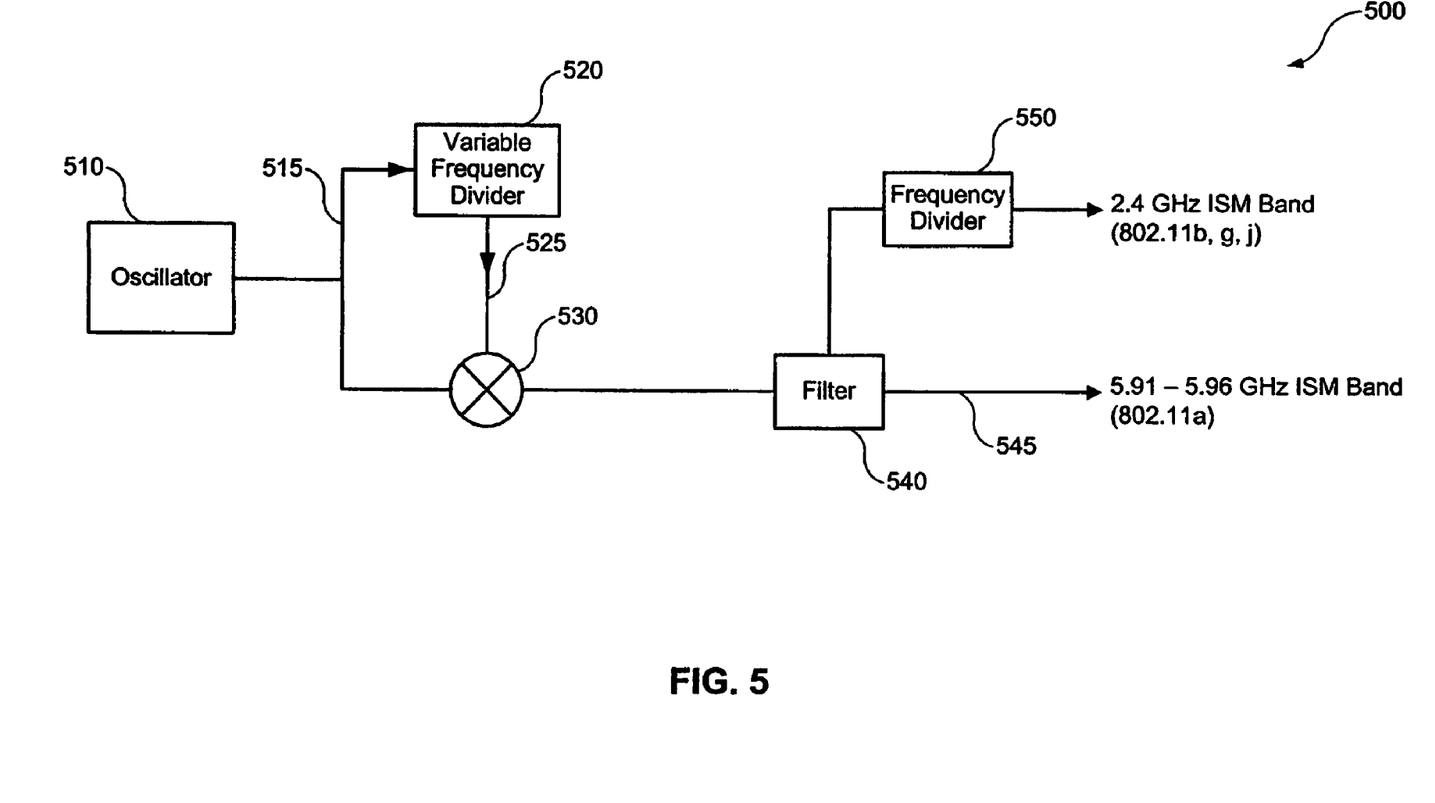

FIG. 5 illustrates a 802.11 frequency generation circuit 500 according to another embodiment of the present invention. Circuit 500 includes an oscillator 510, a variable frequency divider 520, a mixer 530, a filter 540, and a frequency divider 550. Oscillator 510 is configured to generate frequency signals 515 that range from 3346.7 MHz to 4000 MHz. The frequency divider 520 is configured to receive frequency signals 515. Depending upon a desired 802.11 channel frequency output 545, frequency divider 520 selectively divides frequency signals 515 by a divide ratio of 2 or 4 to produce signals 525. However, if the desired 802.11 channel frequency 545 is a 2.4 GHz-based frequency, instead of a 5 GHz-based frequency, then frequency divider 520 divides signals 515 by a divide ratio of 4 to produce signals 525, see Table 2.

In the circuit 500, mixer 530 is configured to receive both frequency signals 515 and 525. Mixer 530 combines signals 515 and 525 to produce a high and a low frequency signal, which is then delivered to filter 540. Filter 540 is a high band pass filter which filters out the low frequency and outputs the high frequency signals 545 having the desired 802.11a channel frequency. Frequency signals 545 can be further processed to produce a 2.4 GHz ISM band frequency. This is done by coupling another frequency divider 550 to filter 540. Frequency divider 550 divides signals 545 by a divide ratio of 2 to produce a desired 2.4 GHz based-frequency for use with 802.11b and 802.11g standards.

By design, the frequency generation circuits 400 and 500 have VCOs that operate in the frequency range of 3346.7 MHz to 4000 MHz instead of 3216 MHz to 3933.3 MHz. Operating in the former frequency range allows the 802.11's VCO to completely avoid the second harmonic frequency range of a VCO found in a Bluetooth transmitter. In other words, the fundamental frequency range of the 802.11 VCO, in circuits 400 and 500, does not overlap with the harmonics of the Bluetooth VCO. This effectively eliminates all of the harmonic interferences and allows for the coexistence of Bluetooth and 802.11 transmitters in a confined environment.

Figure 6A:
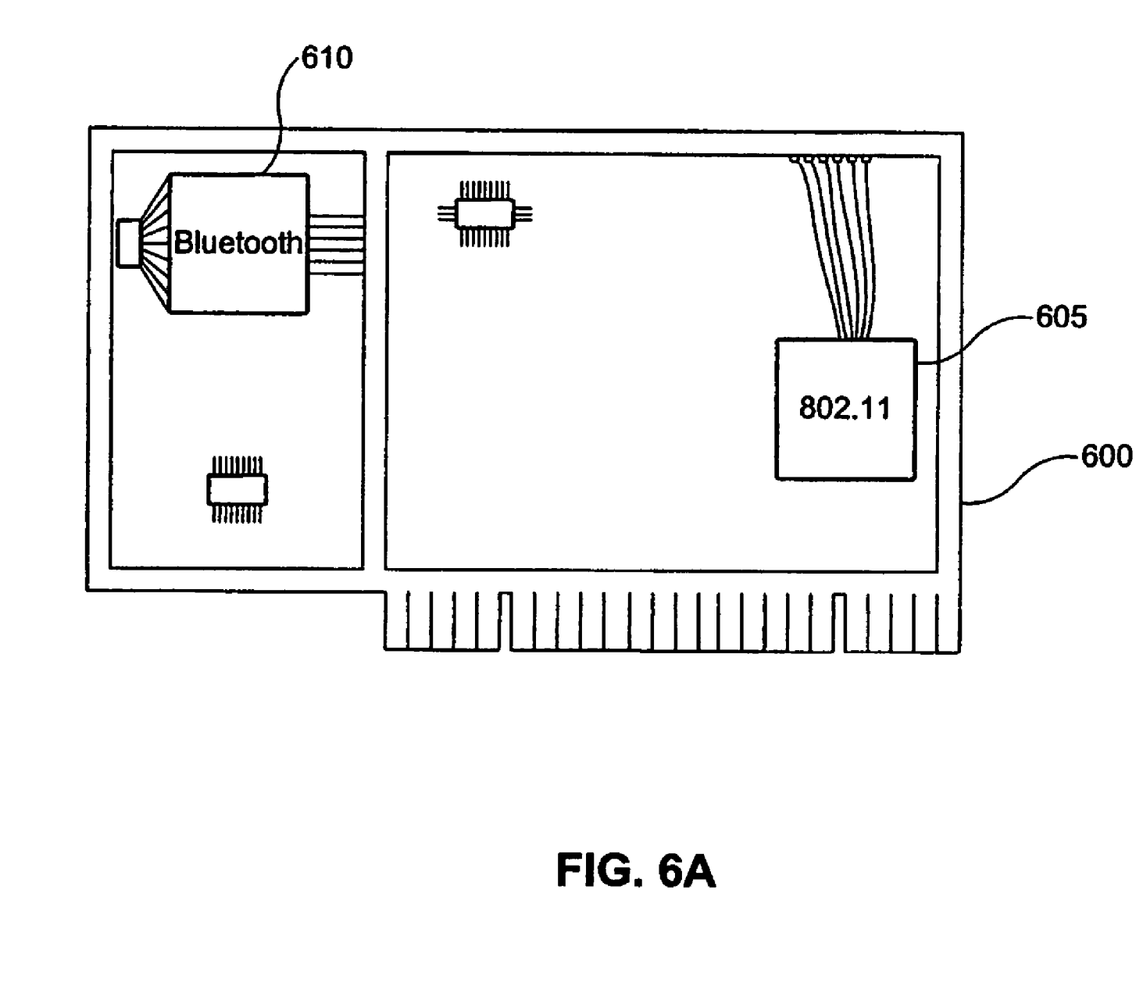
FIGS. 6A-B illustrate exemplary 802.11 and Bluetooth enabled systems according to embodiments of the present invention.

FIG. 6A illustrates a circuit 600 that has both a Bluetooth and an 802.11 chipset according to an embodiment of the present invention. Circuit board 600 includes a 802.11 chipset 605 and a Bluetooth chipset 610. Both of chipsets 605 and 610 contain their respective transceivers. In circuit 600, chipset 605 has a frequency generation circuit 400 or 500. In this way, the coexistence of Bluetooth and 802.11 chipsets on circuit 600 is possible without causing harmonic interferences.

Figure 6B:
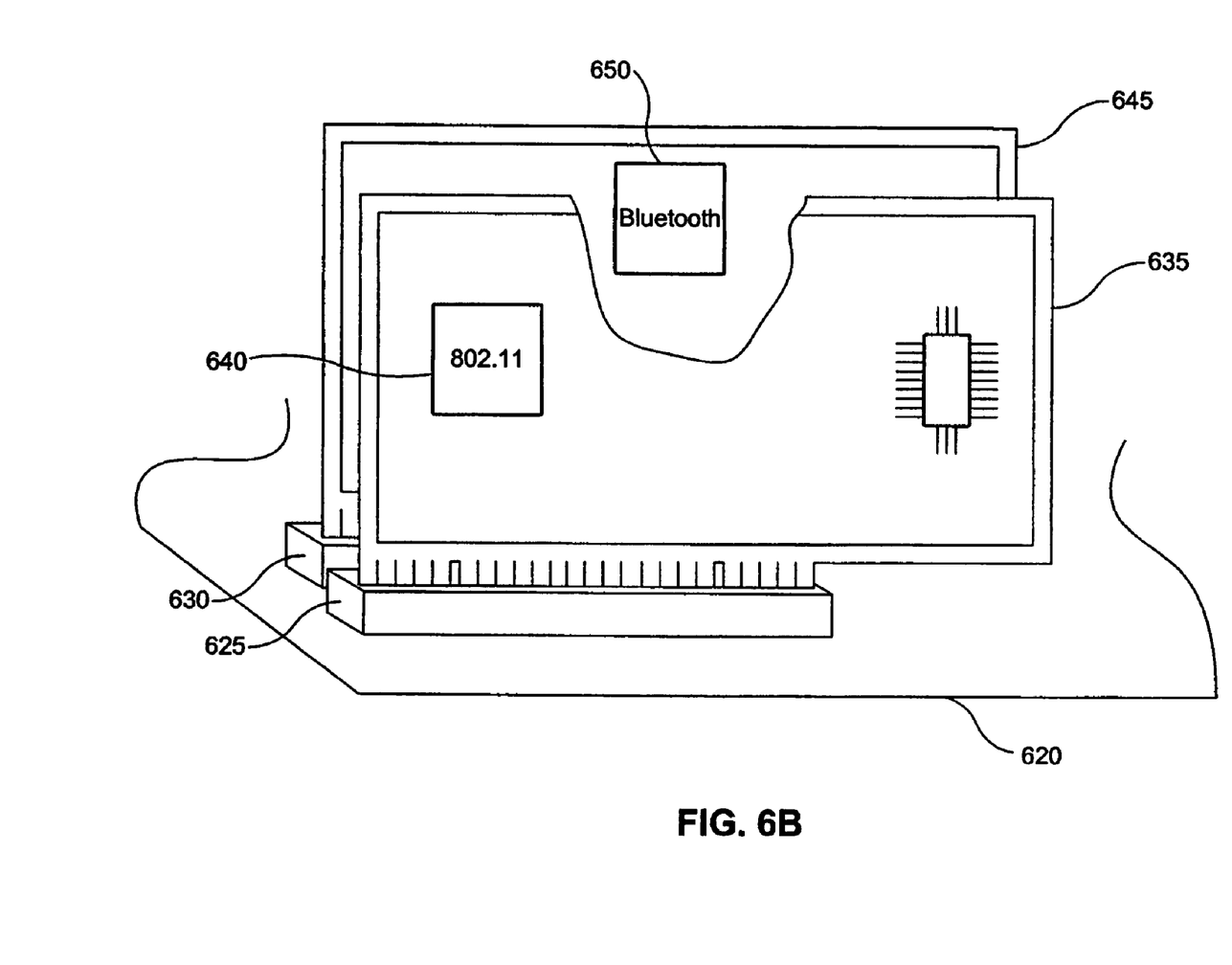

FIG. 6B illustrates a system 620 that contains both Bluetooth and 802.11 transmitters according to an embodiment of the present invention. The system 620 includes interface slots 625 and 630, a 802.11 network card 635, and a Bluetooth network card 645. Interface slots 625 and 630 can either be a Peripheral Component Interconnect (PCI) slot or other suitable expansion slot. In system 620, the 802.11 network card 635 includes a 802.11 chipset 640. Chipset 640 contains a 802.11 transmitter that includes a frequency generation circuit 400 or 500 that prevents harmonic interference with a nearby Bluetooth transmitter. Further, the Bluetooth network card 645 includes a Bluetooth chipset 650 that contains a transmitter operating according to the Bluetooth standard.

Figure 7:
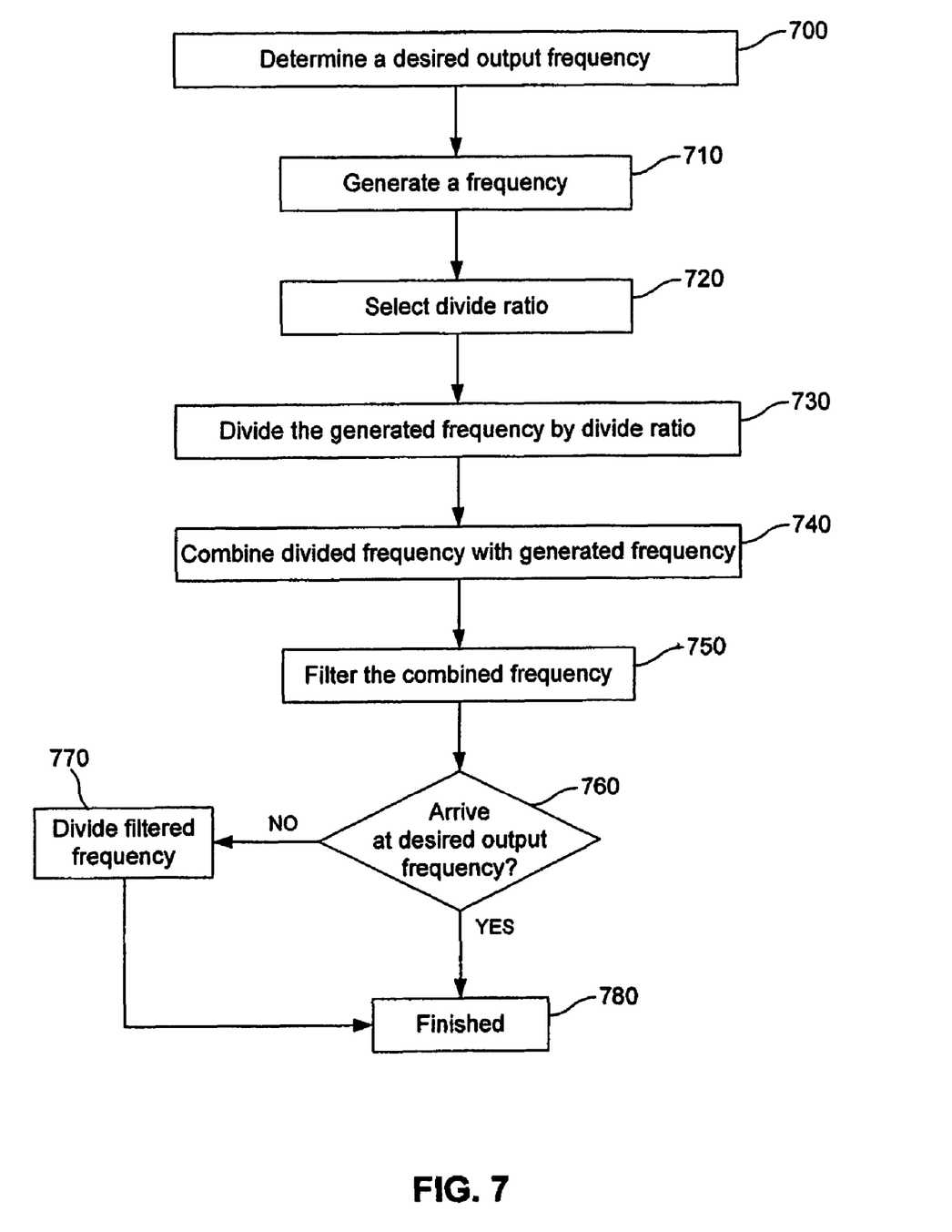
FIG. 7 illustrates an operational flow diagram according to an embodiment of the present invention.

FIG. 7 illustrates an operational flow diagram according to an embodiment of the present invention. In block 700, the frequency output of a 802.11 transmitter is determined. This output frequency could either be a 2.4 GHz or 5 GHz ISM baseband frequency. The frequency channel selected will determine the output frequency of the VCO and the divide ratio, see Table 2. In block 710, a frequency is generated using a VCO of a transmitter such as one located in the 802.11 chipset 640. The frequency of the VCO is selected such that it does not interfere with the harmonic of a nearby frequency generator such as one located in the Bluetooth chipset 650. In an embodiment, the frequency of the 802.11 VCO is operating at a frequency range of 3346.7 MHz to 4000 MHz.

In block 720, a divide ratio is selected based on the desired output frequency of the transmitter. For a 802.11a transmitter, a divide ratio of 4:1 is selected for channel frequencies of 4920 MHz to 5000 MHz. A divide ratio of 2:1 is selected for the remaining frequency channels. For a 802.11b and 802.11g transmitter, the divide ratio is 4:1 for all frequency channels. In block 730, the variable frequency divider divides the input signal by the divide ratio to produce a divided signal. For example, if the desired frequency channel is 4940 MHz, then a divide ratio of 4 is selected. Further, oscillator 510 is set to output frequency signals 515 at 3952 MHz. Signals 515 are then divided by variable frequency divider 420 by a divide ratio of 4 to produce divided frequency signals 525.

In block 740, the divided frequency is combined with the undivided frequency from the VCO using a mixer. In block 750, the mixer's output frequency is then filtered to obtain the higher portion of the mixer's output. In block 760, a determination is made to determine whether the desired channel frequency has been reached. In block 780, the frequency generation process is completed as the output frequency of the filter is a desired 5 GHz-based frequency. In block 770, the filter's output frequency is further divided to obtain a 2.4 GHz-based frequency.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

I claim:

1. A transmitter configured to operate according to an Institute of Electrical and Electronics Engineers (IEEE) 802.11 communications standard that does not interfere with a frequency generator that is configured to operate according to a Bluetooth communications standard, comprising:
    an oscillator configured to output a frequency signal characterized as having a first frequency, wherein the first frequency is outside of a frequency harmonic of the frequency generator that is configured to operate according to the Bluetooth communications standard;
    a first frequency divider, coupled to the oscillator, configured to divide the frequency signal by a divisor to produce a second frequency signal;
    a mixer, coupled to the oscillator and the frequency divider, configured to combine the first frequency signal and the second frequency signal to produce a mixed frequency signal; and
    a filter, coupled to the mixer, configured to filter the mixed frequency signal and to output a filtered frequency signal,
    wherein the divisor is selected based on a desired frequency value of the filtered frequency signal.

2. The transmitter of claim 1, wherein the IEEE 802.11 communications standard is selected from one of: an IEEE 802.11a communications standard, an IEEE 802.11b communications standard, an IEEE 802.11j communications standard, and an IEEE 802.11g communications standard.

3. The transmitter of claim 1, wherein the divisor is 2 or 4.

4. The transmitter of claim 1, wherein the first frequency is from 3313 MHz to 4800 MHz.

5. The transmitter of claim 1, wherein the first frequency is from 3346.7 MHz to 4000 MHz.

6. The transmitter of claim 1, further comprising:
    a second frequency divider coupled to the filter, the second frequency divider being configured to divide the filtered frequency signal to produce a final frequency signal.

7. The transmitter of claim 6, wherein the final frequency signal is characterized as having a 2.4 GHz Industrial, Scientific, and Medical (ISM) band frequency.

8. The transmitter of claim 1, wherein the desired filtered frequency value is a 5 GHz Industrial, Scientific, and Medical (ISM) band frequency.

9. The transmitter of claim 1, wherein the frequency generator is within an effective transmission range of the transmitter.

10. The transmitter of claim 1, wherein the frequency generator and the transmitter are disposed within a confined environment.

11. The transmitter of claim 1, wherein the oscillator and the frequency generator are configured to operate concurrently.

12. A transmitter system, comprising:
    a first transmitter configured to generate a first frequency signal according to a Bluetooth communications standard, the first frequency signal being characterized as having a first frequency; and
    a second transmitter that is placed within an operable transmitting range of the first transmitter, the second transmitter being configured to generate a second frequency signal according to an Institute of Electrical and Electronics Engineers (IEEE) 802.11 communications standard, the second frequency signal being characterized as having a second frequency that falls outside of a frequency harmonic range of the first frequency, the second transmitter comprising:
        an oscillator configured to output the second frequency signal;
        a frequency divider coupled to the oscillator, the first frequency divider being configured to divide the second frequency signal by a divisor to produce a third frequency signal;
        a mixer coupled to the oscillator and the first frequency divider, the mixer being configured to combine the second frequency signal and third frequency signal to produce a mixed frequency signal.

13. The transmitter system of claim 12, wherein the second transmitter further comprises:
    a filter coupled to the mixer, the filter being configured to filter the mixed frequency signal to produce a filtered frequency signal;
    wherein the divisor is selected based on a desired frequency value of the filtered frequency signal.

14. The transmitter system of claim 13, wherein divisor is 2 or 4.

15. The transmitter system of claim 13, wherein the second transmitter further comprises:
    a second frequency divider coupled to the filter, the second frequency divider being configured to divide the filtered frequency signal to produce a final frequency signal.

16. The transmitter system of claim 15, wherein the final frequency signal is characterized as having a 2.4 GHz Industrial, Scientific, and Medical (ISM) band frequency.

17. The transmitter system of claim 13, wherein the desired filtered frequency value is a 5 GHz Industrial, Scientific, and Medical (ISM) band frequency.

18. The transmitter system of claim 10, wherein the IEEE 802.11 communications standard is selected from one of: an IEEE 802.11a communications standard, an IEEE 802.11b communications standard, an IEEE 802.11j communications standard, and an IEEE 802.11g communications standard.

19. The transmitter system of claim 12, wherein the second frequency is from 3313 MHz to 4800 MHz.

20. The transmitter system of claim 12, wherein the second frequency is from 3346.7 MHz to 4000 MHz.

21. The transmitter system of claim 12, wherein the first frequency is from 1601 MHz to 1656 MHz.

22. The transmitter system of claim 12, wherein the first and second transmitters are formed on a common substrate.

23. The transmitter system of claim 12, wherein the first and second transmitters are formed on a common circuit board.

24. The transmitter system of claim 12, wherein the first transmitter and the second transmitter are configured to operate concurrently.

25. An 802.11 transmitter, comprising:
an oscillator configured to generate a first frequency signal having a frequency range from 3313 MHz to 4800 MHz according to an Institute of Electrical and Electronics Engineers (IEEE) 802.11 communications standard;
a variable frequency divider coupled to the oscillator, the variable frequency divider being configured to divide the first frequency signal by a divisor to produce a second frequency signal;
a mixer coupled to the oscillator and the variable frequency divider, the mixer being configured to combine the first frequency signal and the second frequency signal to produce a mixed frequency signal; and
a filter coupled to the mixer, the filter being configured to filter the mixed frequency signal to output a filtered frequency signal;
wherein the divisor is selected based on a desired frequency value of the filtered frequency that is outside of a frequency harmonic of another transmitter operating according to a Bluetooth communications standard within an effective transmission range of the 802.11 transmitter.

26. The 802.11 transmitter of claim 25, wherein the divisor is 2 or 4.

27. The 802.11 transmitter of claim 25, wherein the first frequency is from 3346.7 MHz to 4000 MHz.

28. The 802.11 transmitter of claim 25, further comprising:
a second frequency divider coupled to the filter, the second frequency divider being configured to divide the filtered frequency signal to produce a desired frequency signal.

29. The 802.11 transmitter of claim 28, wherein the desired frequency signal is characterized as having a 2.4 GHz Industrial, Scientific, and Medical (ISM) band frequency.

30. The 802.11 transmitter of claim 25, wherein the desired filtered frequency value is a 5 GHz Industrial, Scientific, and Medical (ISM) band frequency.

31. The 802.11 transmitter of claim 25, wherein the oscillator and the other transmitter are configured to operate concurrently.

32. A method for generating a first frequency signal according to an Institute of Electrical and Electronics Engineers (IEEE) 802.11 communications standard that does not interfere with generation of a second frequency signal according to a Bluetooth communications standard, the method comprising:
generating the first frequency signal, the first frequency signal characterized as having a first frequency that is outside a frequency harmonic range of the second frequency signal;
dividing the first frequency signal by a divisor to produce a third frequency signal;
combining the third frequency signal with the first frequency signal to produce a fourth frequency signal; and
filtering the fourth frequency signal to produce a filtered frequency signal;
wherein the divisor is selected based on a desired frequency value of the filtered frequency signal.

33. The method of claim 32, wherein the divisor is 2 or 4.

34. The method of claim 32, wherein the first frequency is from 3313 MHz to 4800 MHz.

35. The method of claim 32, wherein the first frequency is from 3346.7 MHz to 4000 MHz.

36. The method of claim 32, further comprising:
dividing the filtered frequency signal to produce a final frequency signal.

37. The method of claim 36, wherein the final frequency signal is characterized as having a 2.4 GHz Industrial, Scientific, and Medical (ISM) band frequency.

38. The method of claim 32, wherein the desired frequency value is a 5 GHz Industrial, Scientific, and Medical (ISM) band frequency.

39. The method of claim 32, further comprising:
generating the second frequency, wherein the generating the second frequency occurs concurrently with the generating the first frequency.

* * * * *

UNITED STATES PATENT AND TRADEMARK OFFICE
CERTIFICATE OF CORRECTION

| | | |
|---|---|---|
| PATENT NO. | : 8,050,636 B2 | Page 1 of 1 |
| APPLICATION NO. | : 11/320463 | |
| DATED | : November 1, 2011 | |
| INVENTOR(S) | : Hung-Ming Chien | |

It is certified that error appears in the above-identified patent and that said Letters Patent is hereby corrected as shown below:

At Title Page, Item (57), ABSTRACT, line 12, please replace "The filter is then used to filters" with --The filter is then used to filter--.

At Title Page, Item (57), ABSTRACT, line 14, please replace "selected base on" with --selected based on--.

At column 8, line 36, please replace "wherein divisor is" with --wherein the divisor is--.

Signed and Sealed this
Twentieth Day of March, 2012

David J. Kappos
*Director of the United States Patent and Trademark Office*